United States Patent
Chang

(10) Patent No.: US 7,557,323 B2
(45) Date of Patent: Jul. 7, 2009

(54) WIRE RETRIEVING DEVICE FOR CUTTING MACHINE

(76) Inventor: Jul-Chen Chang, No. 5, 36$^{th}$ Road, Taichung Industrial Park, Taichung 407 (TW)

( * ) Notice: Subject to any disclaimer, the term of this patent is extended or adjusted under 35 U.S.C. 154(b) by 129 days.

(21) Appl. No.: 11/717,490

(22) Filed: Mar. 13, 2007

(65) Prior Publication Data

US 2008/0223827 A1 Sep. 18, 2008

(51) Int. Cl.
*B23K 11/22* (2006.01)
*B23H 7/02* (2006.01)

(52) U.S. Cl. ....................... 219/68; 219/69.12

(58) Field of Classification Search ............ 219/69.12, 219/68; 83/100, 167, 200.1, 950; 140/139, 140/140
See application file for complete search history.

(56) References Cited

U.S. PATENT DOCUMENTS 4,618,761 A * 10/1986 Inoue et al. ............. 219/69.15
4,633,743 A * 1/1987 Ichikawa ..................... 83/100
4,698,478 A * 10/1987 Girardin .................. 219/69.12
5,288,966 A * 2/1994 Kawanabe et al. ....... 219/69.12
5,302,796 A * 4/1994 Kuriki ..................... 219/69.12
6,078,019 A * 6/2000 Medici et al. ............ 219/69.12

FOREIGN PATENT DOCUMENTS

JP 2005-125413 A * 5/2005

* cited by examiner

*Primary Examiner*—Geoffrey S Evans
(74) *Attorney, Agent, or Firm*—Charles E. Baxley

(57) ABSTRACT

A wire retrieving device for a cutting machine includes a block connected with an air source and a blowing path is defined through the block. A suction path is defined in a side of the block and has an oblique port formed in a surface of the block through which the discarded wire is sucked into the suction path which further has an engaging port communicating with the blowing path. A pushing member removably pushes the metal wire toward the block by an electromagnetic valve when the metal wire needs to be cut by an electrode unit. A pair of driving rollers located a down stream of the electrode unit and pulls the metal wire toward the upper mold. The discarded wire is blowing out from the blowing path and is collected in a collection tank via a tube.

3 Claims, 4 Drawing Sheets

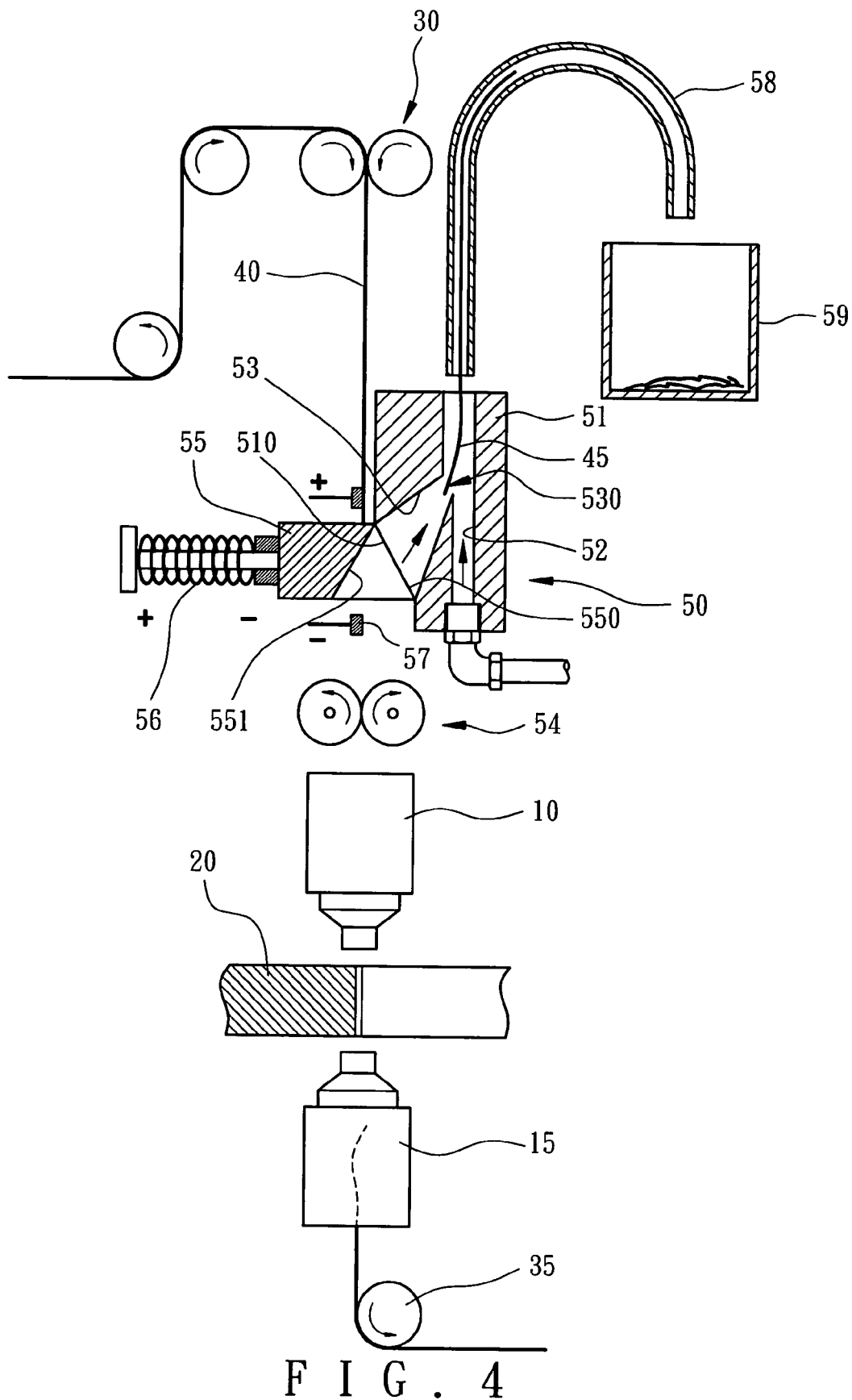
F I G . 4

WIRE RETRIEVING DEVICE FOR CUTTING MACHINE

FIELD OF THE INVENTION

The present invention relates to a wire retrieving device for a cutting machine and the discarded wires are retrieved quickly and completely.

BACKGROUND OF THE INVENTION

A conventional cutting machine uses metal wires such as copper wires to generate sparks which are able to cut metal objects with high hardness. The sparks are created between the metal wire and the metal object so as to cut the metal object. In order to precisely cut the metal object, the metal wire has very small diameter and if the tiny metal wire contacts the metal object, or if the speed of the wire dispensing unit and the wire pulling unit are different, the metal wire is easily broken. The broken metal wire cannot be used again and has to be retrieved. Generally, the broken wire is cut and retrieved manually and a new metal wire needs to be re-installed to the cutting machine again. This costs a lot of time and might be dangerous to the users.

A wire retrieving device uses air flow to blow the broken wires out from a pipe so as to quickly remove the broken wires. However, due to the metal wire has certain level of extendibility, so that during blowing process, the metal wire is not cut completely and the metal wire are pulled out a distance. The users take time to cut and re-arrange the metal wire.

The present invention intends to provide a wire retrieving device for a cutting machine and includes a block with a blowing path and a suction path defined therethrough, the broken wire is pushed by a pushing member toward the block and is sucked into a tank by pressurized air flow through the blowing path and the suction path.

SUMMARY OF THE INVENTION

The present invention relates to a wire retrieving device for a cutting machine and comprises a block located beside the metal wire and a blowing path is defined through the block. An open end of the blowing path is connected with an air source and a suction path is defined in a side of the block. The suction path has an oblique port formed in a surface of the block, and an engaging port which communicates with the blowing path. A width of the oblique portion is larger than that of the engaging port. A pushing member removably pushes the metal wire toward the block by an electromagnetic valve. An electrode unit includes a positive electrode and a negative electrode so as to cut the metal wire. The pushing member is located between the positive and negative electrodes. A pair of driving rollers is located a down stream of the electrode unit and pulls the metal wire toward the upper mold. A tube has an end co-axially communicating with the other end of the blowing path.

The primary object of the present invention is to provide a wire retrieving device for a cutting machine and includes a pushing member to be engaged with a block with blowing path so as to smoothly suck the broken wire into a collection tank.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 shows the broken wire is sucked into the collection tank via a tube.

DETAILED DESCRIPTION OF THE PREFERRED EMBODIMENT

Figure 1:
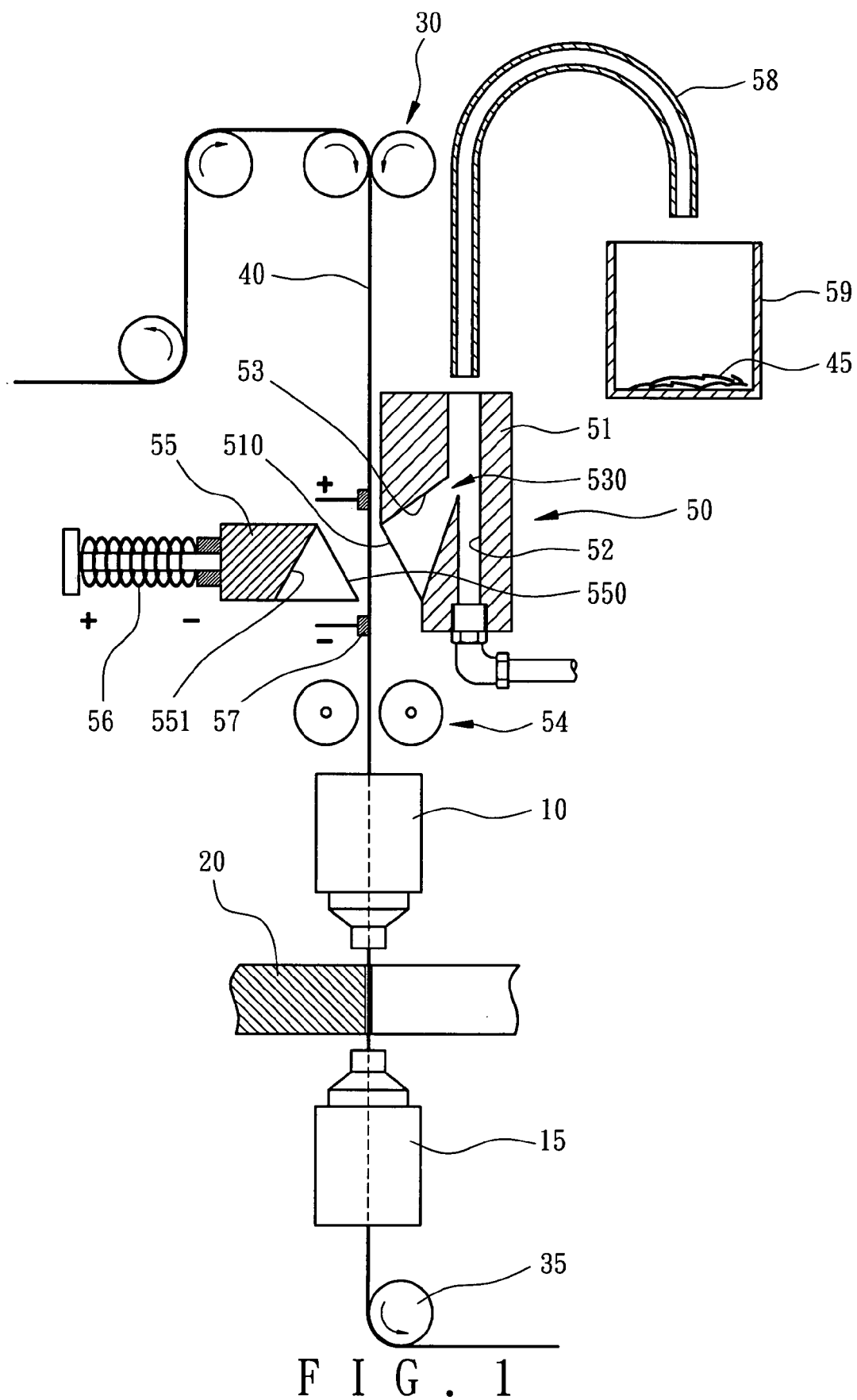
FIG. 1 shows the wire retrieving device for a cutting machine of the present invention.

Referring to FIG. 1, the cutting machine of the present invention comprises a dispensing unit 30 which is composed of a plurality pairs of rollers which drives the metal wire 40 forward. The metal wire 40 extends through an upper mold 10 and a lower mold 15 so as to cut a metal object 20. The metal wire 40 passing through the lower mold 15 is then pulled by a pair of pulling rollers 35 away from the metal object 20.

A wire retrieving device comprises a retrieving unit 50 including a block 51 which is located beside the metal wire 40 and a blowing path 52 is defined through the block 51. An open end of the blowing path 52 is connected with an air source which is a compressor so as to provide pressurized air into the blowing path 52. A suction path 53 is defined in a side of the block 51 and has an oblique port 510 formed in a surface of the block 51 and an engaging port 530 which communicates with the blowing path 52. A width of the oblique portion 510 is larger than that of the engaging port 530. When the pressurized air is introduced into the blowing path 52, a low pressurized is formed in the blowing path 52 so that the air in the suction path 53 is sucked into the blowing path 52. An inverted J-shaped tube 58 has an end co-axially communicating with the other end of the blowing path 52 and a collection tank 59 is located at the other end of the tube 58.

An electrode unit 57 includes a positive electrode and a negative electrode so as to cut the metal wire 40. A pushing member 5 is located beside the metal wire 40 and between the positive and negative electrodes. The pushing member 55 is able to push the metal wire 40 toward the block 501 by an electromagnetic valve 56. The pushing member 55 has an inclined open end 550 which is removably matched with the oblique port 510 of the block 51 when the metal wire 40 is broken. The pushing member 55 has a recess which includes an inclined guide surface 551 which is cooperated with an inner surface of the suction path 53 to form a continuous surface to guide the discarded wire 45 to be sucked into the suction path 53.

A pair of driving rollers 54 is located a down stream of the electrode unit 57 and is used to pull the metal wire 54 toward the upper mold 10.

Figure 2:
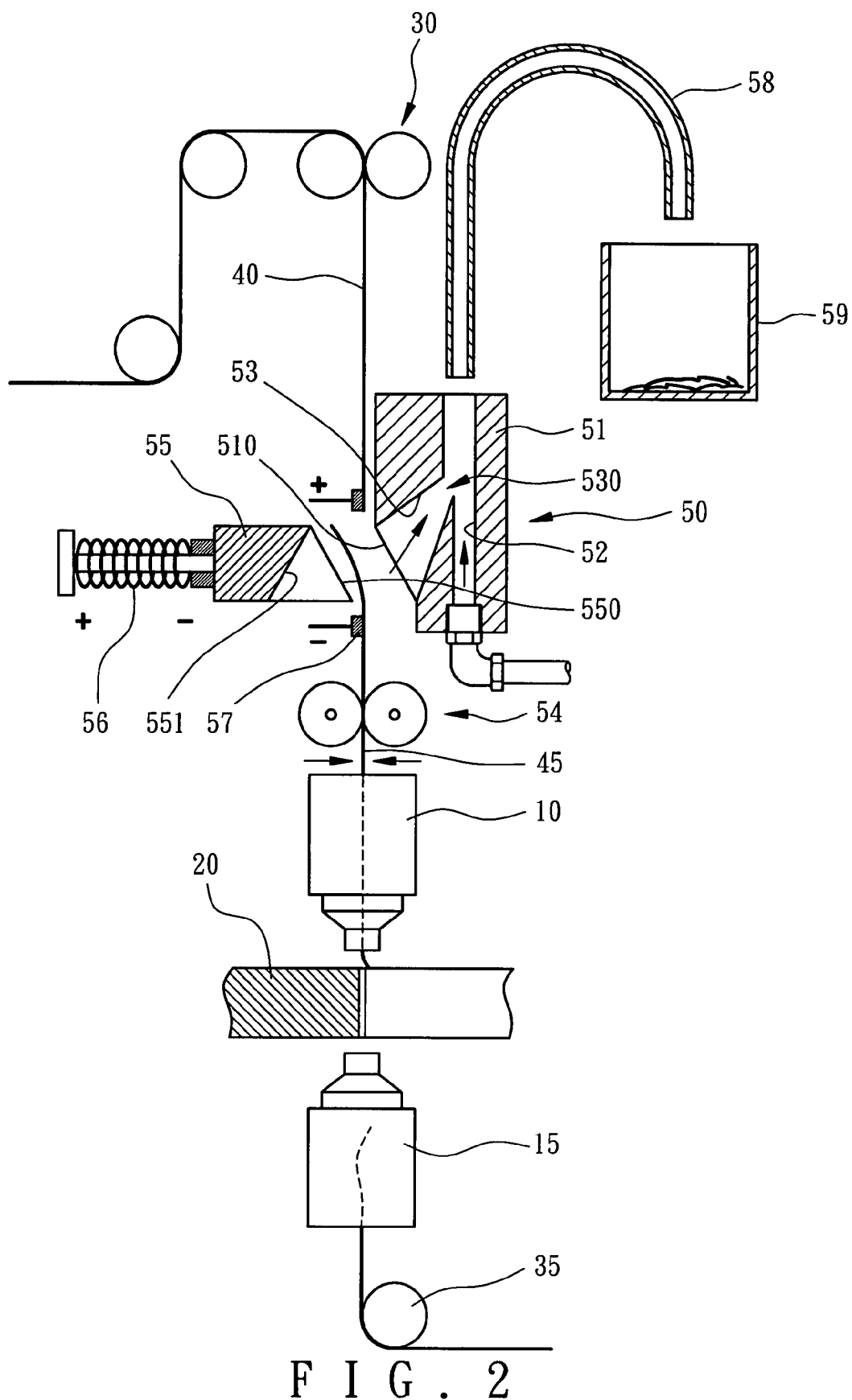
FIG. 2 shows that the metal wire is cut by the electrode unit and pressurized air is introduced into the blowing path of the block of the present invention.
Figure 3:
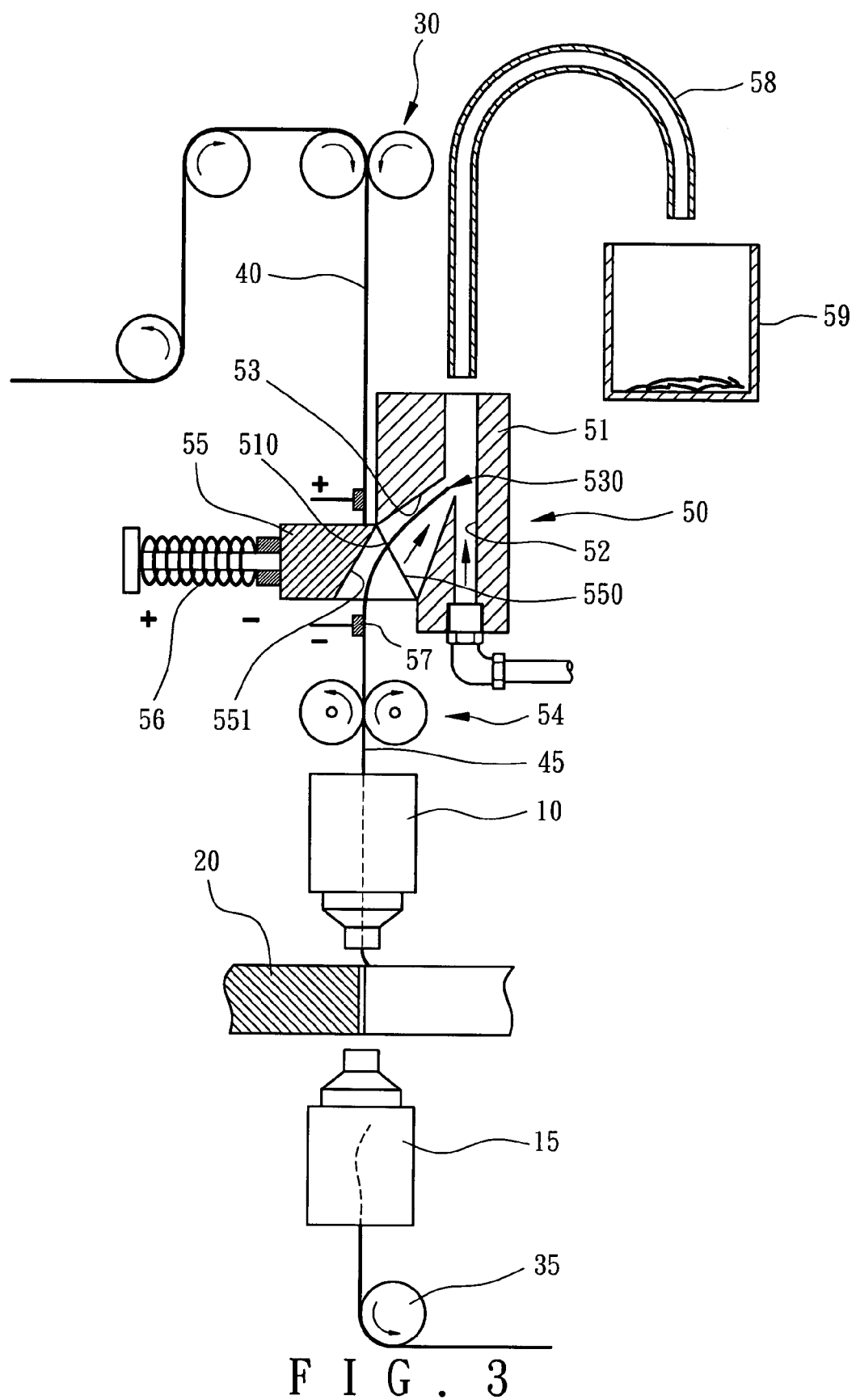
FIG. 3 shows that the pushing member is engaged with the block and the broken wire is sucked into the block.

As shown in FIGS. 2 to 4, when the metal wire 40 is broken during cutting the metal object 20, the driving rollers 54 are moved toward each other to hold the metal wire 40, and the pressurized air is introduced into the blowing path 52. In the same time, the electrode unit 57 is activated to cut the metal wire 40 to form a section of discarded wire 45 as shown in FIG. 3.

The discarded wire 45 is then pushed by the pushing member 55 by the lector-magnetic valve 56 toward the suction path 53 of the block 51 and sucked into the blowing path 52 due to the pressure difference between the blowing path 52 and the suction path 53. The discarded wire 45 enters into the tube 58 and is collected in the collection tank 59.

While we have shown and described the embodiment in accordance with the present invention, it should be clear to those skilled in the art that further embodiments may be made without departing from the scope of the present invention.

What is claimed is:

1. A wire retrieving device for a cutting machine which includes an upper mold, a lower mold, a dispensing unit for dispensing a metal wire toward the upper mold, the wire retrieving device comprising:

a retrieving unit including a block which is adapted to be located beside the metal wire and a blowing path defined through the block, an open end of the blowing path connected with an air source, a suction path defined in a side of the block and having an oblique port formed in a surface of the block and an engaging port which communicates with the blowing path, a width of the oblique portion being larger than that of the engaging port;

a pushing member adapted to push the metal wire toward the block by an electro-magnetic valve, the pushing member having an inclined open end which is removably matched with the oblique port of the block;

an electrode unit including a positive electrode and a negative electrode, the pushing member located between the positive and negative electrodes, the electrode unit adapted to cut the metal wire, a pair of driving rollers located a down stream of the electrode unit and adapted to pull the metal wire toward the upper mold, and a tube having an end co-axially communicating with the other end of the blowing path.

2. The device as claimed in claim 1, wherein pushing member has a recess which includes an inclined guide surface which is cooperated with an inner surface of the suction path to form a continuous surface to be adapted to guide discarded wire 45 to be sucked into the suction path.

3. The device as claimed in claim 1, wherein the tube is an inverted J-shaped tube and a collection tank is located at the other end of the tube.

* * * * *